United States Patent
Dearman (10) Patent No.: US 9,280,280 B2
(45) Date of Patent: Mar. 8, 2016

(54) METHOD, APPARATUS AND COMPUTER PROGRAM PRODUCT FOR PRESENTING DESIGNATED INFORMATION ON A DISPLAY OPERATING IN A RESTRICTED MODE

(75) Inventor: David Alexander Dearman, San Bruno, CA (US)

(73) Assignee: Nokia Technologies Oy, Espoo (FI)

( * ) Notice: Subject to any disclaimer, the term of this patent is extended or adjusted under 35 U.S.C. 154(b) by 144 days.

(21) Appl. No.: 13/563,366

(22) Filed: Jul. 31, 2012

(65) Prior Publication Data
US 2014/0035804 A1    Feb. 6, 2014

(51) Int. Cl.
G06F 3/041     (2006.01)
G06F 3/0488    (2013.01)
H04M 1/67      (2006.01)
H04M 1/725     (2006.01)

(52) U.S. Cl.
CPC ............ *G06F 3/04883* (2013.01); *H04M 1/67* (2013.01); *H04M 1/72544* (2013.01); *H04M 1/72583* (2013.01); *H04M 2250/22* (2013.01)

(58) Field of Classification Search
CPC ................ G06F 3/048; G06F 3/04883; G06F 3/041–3/047; H04M 1/72544; H04M 1/67; H04M 1/72583; H04M 2250/22
See application file for complete search history.

(56) References Cited

U.S. PATENT DOCUMENTS

| | | | |
|---|---|---|---|
| 5,394,166 A | 2/1995 | Shimada | |
| 8,130,206 B2 | 3/2012 | Lindroos | |
| 8,630,623 B2 * | 1/2014 | Park et al. | 455/411 |
| 2009/0006400 A1 * | 1/2009 | Lopez | 707/8 |
| 2010/0306705 A1 * | 12/2010 | Nilsson | 715/835 |
| 2012/0184247 A1 * | 7/2012 | Choe et al. | 455/411 |

FOREIGN PATENT DOCUMENTS

CN    201986002 U    9/2011

OTHER PUBLICATIONS

Perera, Gilberto J.; "How to Create a Useful Lock Screen for Your iPhone"; Downloaded from the internet on Aug. 16, 2012 at http://www.gilsmethod.com/how-to-create-a-useful-lock-screen-on-your-iphone; pp. 1-10.
Gordon, Rob; "WP7 Lock Screen-Help Get Your Lost Windows Phone Returned"; Downloaded from the internet on Aug. 16, 2012 at http://www.techonthego.uk/2011/12/wp7-lock-screenhelp-get-your-lost-windows-phone-returned-5822; pp. 1-7.

* cited by examiner

*Primary Examiner* — Yong H Sim
(74) *Attorney, Agent, or Firm* — Alston & Bird LLP (57) ABSTRACT

A method is provided for presenting information on a display to a user when the display is operating, at least in part, in a locked or low-power mode. In particular, an example method may include providing for operation of a device in an unrestricted mode, and receiving an indication that an area presented on a display of the device is a designated area, where another area of the display that is not the designated area is an undesignated area. The designated area may include designated information while the undesignated area may include undesignated information. The method may further include providing for operation of the device in a restricted mode, where the designated information is presented in the restricted mode and the undesignated information is not presented in the restricted mode.

19 Claims, 9 Drawing Sheets

METHOD, APPARATUS AND COMPUTER PROGRAM PRODUCT FOR PRESENTING DESIGNATED INFORMATION ON A DISPLAY OPERATING IN A RESTRICTED MODE

TECHNOLOGICAL FIELD

Example embodiments of the present invention relate generally to the presentation of information on a display, and more particularly, presenting designated information from a designated area of a display when a mobile terminal enters a restricted mode, such as a locked or low-power mode.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed consumer demands while providing more flexibility and immediacy of information transfer.

Mobile devices, such as cellular telephones, have become smaller and lighter while also becoming more capable of performing tasks that far exceed a traditional voice call. Mobile devices are becoming small, portable computing devices that are capable of running a variety of applications and presenting a variety of types of information to a user. As mobile devices may contain personal information which a user wishes to protect, devices may include security features such as disabling, turning off, or locking a display, precluding personal information from being presented, which may be enabled after an elapsed time without the device receiving an input or in response to a user command to lock the display. Further, as devices may include various types of input means, such as buttons, voice controls, sensors, etc., an unlocked or input-enabled device may receive an accidental input causing an inadvertent operation of the device, such as placing a call unintentionally. Further still, providing power to a display may consume significant power and reduce the battery life of mobile devices. As such, locking the display of a device or entering a low-power mode may be a desirable feature.

SUMMARY

In general, an example embodiment of the present invention provides an improved method of presenting information on a display to a user when a mobile terminal is operating, at least in part, in a locked or low-power mode. Corresponding apparatus and computer program products are also provided according to other example embodiments.

In particular, the method of example embodiments may include providing for operation of a device in an unrestricted mode, and receiving an indication that an area presented on a display of the device is a designated area, where another area of the display that is not the designated area is an undesignated area. The designated area may include designated information while the undesignated area may include undesignated information. The method may further include providing for operation of the device in a restricted mode, where the designated information is presented in the restricted mode and the undesignated information is not presented in the restricted mode. The unrestricted mode may include an unlocked mode while the restricted mode may include a locked mode.

The method of example embodiments may include providing for display of predefined information on the display when the display is operating in the restricted mode, and repositioning the predefined information in response to the designated information being presented in the restricted mode. The designated area may include at least one input area, and the at least one input area may remain operable when the device is operating in the restricted mode. The designated information may be modified before being presented in the restricted mode. Receiving an indication that an area presented on the display is a designated area may comprise receiving an input circumscribing the area presented on the display. The designated information may include dynamically updated information, and the method may include updating the dynamically updated information when the display is operating in the restricted mode.

According to another embodiment of the present invention, an apparatus is provided. The apparatus may include at least one processor and at least one memory including computer program code. The at least one memory and the computer program code may be configured to, with the at least one processor, cause the apparatus to provide for operation of a device in an unrestricted mode, and receive an indication that an area presented on a display of the device is a designated area, where another area of the display that is not the designated area is an undesignated area, the designated area including designated information, and the undesignated area including undesignated information. The apparatus may further be caused to provide for operation of the device in a restricted mode, where the designated information is presented in the restricted mode, and the undesignated information is not presented in the restricted mode. The unrestricted mode may be an unlocked mode and the restricted mode may be a locked mode.

An apparatus according to example embodiments may also be caused to provide for display of predefined information on the display when the display is operating in the restricted mode, and reposition the predefined information in response to the designated information being presented in the restricted mode. The designated area may include at least one input area, and the at least one input area may remain operable when the device is operating in the restricted mode. The designated information may be modified before being presented in the restricted mode. Causing the apparatus to receive an indication that an area presented on the display is a designated area may include causing the apparatus to receive an input circumscribing the area presented on the display. The designated information may include dynamically updated information, and the apparatus may be caused to update the dynamically updated information when the display is operating in the restricted mode.

A further embodiment of the invention may include a computer program product including at least one computer-readable storage medium having computer-executable program code instructions stored therein. The computer executable program code instructions may include program code instructions for providing for operation of a device in an unrestricted mode, program code instructions for receiving an indication that an area presented on a display of the device is a designated area, where another area of the display that is not the designated area is an undesignated area, the designated area including designated information and the undesignated area including undesignated information. The computer program product may further include program code instructions for providing for operation of the device in a restricted mode, where the designated information is presented in the restricted mode and the undesignated information is not presented in the restricted mode. The unrestricted mode may be an unlocked mode and the restricted mode may be a locked mode.

Computer program products of example embodiments may include program code instructions for providing for display of predefined information on the display when the device is operating in the restricted mode, and program code instructions for repositioning the predefined information in response to the designated information being presented in the restricted mode. The designated area may include at least one input area, and the at least one input area may remain operable when the display is operating in the restricted mode. Example embodiments may further include program code instructions for modifying the designated information before it is presented in the restricted mode. The program code instructions for receiving an indication that an area presented on the display is a designated area may include program code instructions for receiving an input circumscribing the area presented on the display.

BRIEF DESCRIPTION OF THE DRAWINGS

Having thus described certain example embodiments of the invention in general terms, reference will now be made to the accompanying drawings, which are not necessarily drawn to scale, and wherein:

DETAILED DESCRIPTION

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the example embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
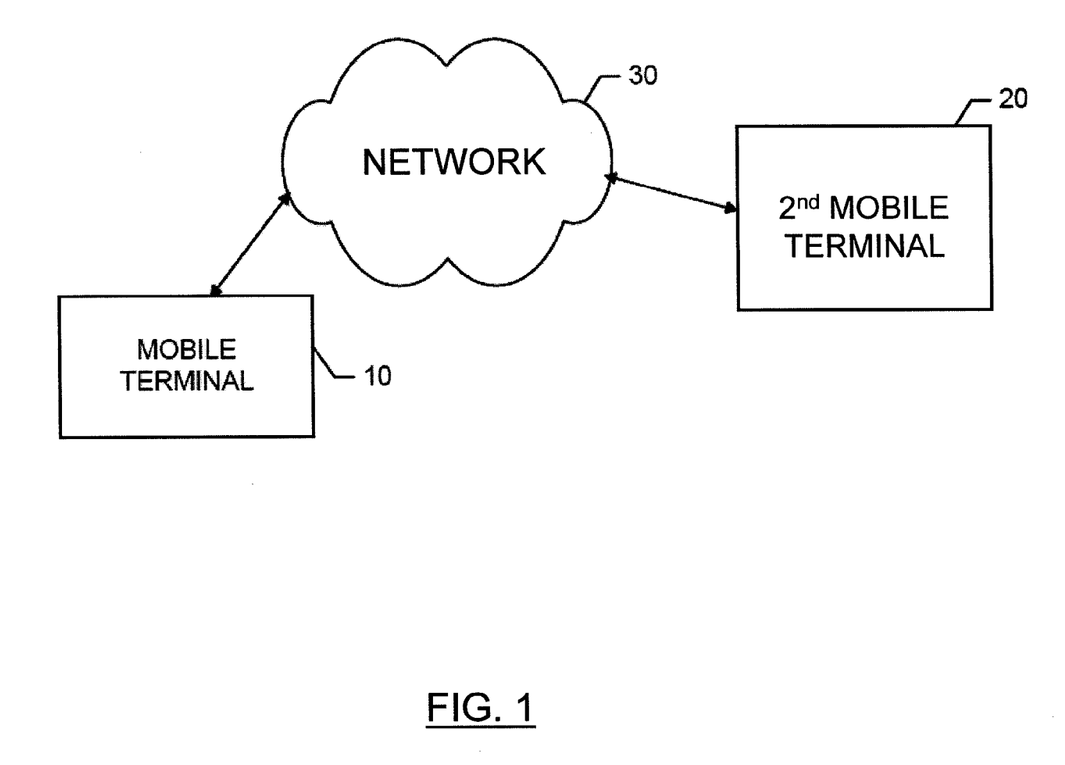
FIG. 1 illustrates a communication system that may be configured in accordance with an example embodiment of the present invention.

A session may be supported by a network 30 as shown in FIG. 1 that may include a collection of various different nodes, devices or functions that may be in communication with each other via corresponding wired and/or wireless interfaces or in ad-hoc networks such as those functioning over Bluetooth® interfaces. A network session may include various types of network communications such as placing/receiving a call, use of an online application (e.g., a social networking application), internet browsing, or the like. As such, FIG. 1 should be understood to be an example of a broad view of certain elements of a system that may incorporate example embodiments of the present invention and not an all-inclusive or detailed view of the system or the network 30. Although not necessary, in some example embodiments, the network 30 may be capable of supporting communication in accordance with any one or more of a number of first-generation (1G), second-generation (2.G), 2.5G, third-generation (3G), 3.5G, 3.9G, fourth-generation (4G) mobile communication protocols and/or the like.

One or more communication terminals, such as the mobile terminal 10 and the second mobile terminal 20, may be in communication with each other via the network 30 and each may include an antenna or antennas for transmitting signals to and for receiving signals from a base site, which could be, for example a base station that is part of one or more cellular or mobile networks or an access point that may be coupled to a data network, such as a local area network (LAN), a metropolitan area network (MAN), and/or a wide area network (WAN), such as the Internet. In turn, other devices (e.g., personal computers, server computers or the like) may be coupled to the mobile terminal 10 and the second mobile terminal 20 via the network 30. By directly or indirectly connecting the mobile terminal 10 and the second mobile terminal 20 and other devices to the network 30, the mobile terminal 10 and the second mobile terminal 20 may be enabled to communicate with the other devices or each other, for example, according to numerous communication protocols including Hypertext Transfer Protocol (HTTP) and/or the like, to thereby carry out various communication or other functions of the mobile terminal 10 and the second mobile terminal 20, respectively.

In example embodiments, either of the mobile terminals may be mobile or fixed communication devices. Thus, for example, the mobile terminal 10 and the second mobile terminal 20 could be, or be substituted by, any of personal computers (PCs), personal digital assistants (PDAs), wireless telephones, desktop computers, laptop computers, mobile computers, cameras, video recorders, audio/video players, positioning devices, game devices, television devices, radio devices, or various other devices or combinations thereof.

Figure 2:
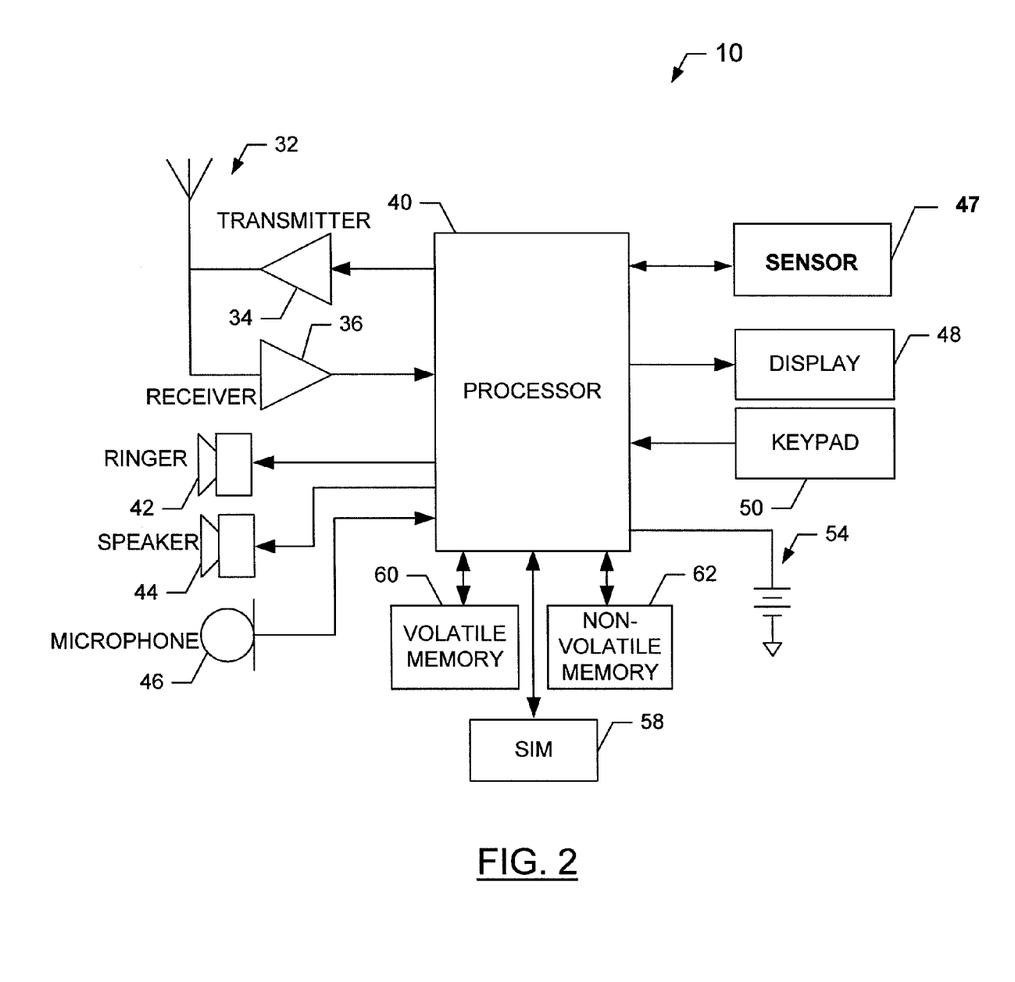
FIG. 2 is a schematic block diagram of a mobile device that may be configured according to an example embodiment of the present invention.

Although the mobile terminal 10 may be configured in various manners, one example of a mobile terminal that could benefit from an example embodiment of the invention is depicted in the block diagram of FIG. 2. While several embodiments of the mobile terminal may be illustrated and hereinafter described for purposes of example, other types of mobile terminals, such as portable digital assistants (PDAs), pagers, mobile televisions, gaming devices, all types of computers (e.g., laptops, tablet computers, or mobile computers), cameras, audio/video players, radio, global positioning system (GPS) devices, or any combination of the aforementioned, and other types of communication devices, may employ an example embodiment of the present invention. As described, the mobile terminal may include various means for performing one or more functions in accordance with an example embodiment of the present invention, including those more particularly shown and described herein. It should be understood, however, that a mobile terminal may include alternative means for performing one or more like functions, without departing from the spirit and scope of the present invention.

The mobile terminal 10 illustrated in FIG. 2 may include an antenna 32 (or multiple antennas) in operable communication with a transmitter 34 and a receiver 36. The mobile terminal may further include an apparatus, including at least one processor 40 and at least one memory. Among other functions, the processor provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile terminal may be capable of operating with one or more air interface standards, communication protocols, modulation types, and access types. By way of illustration, the mobile terminal may be capable of operating in accordance with any of a number of first, second, third and/or fourth-generation communication protocols or the like. For example, the mobile terminal may be capable of operating in accordance with second-generation (2G) wireless communication protocols IS-136, GSM (Global System for Mobile Communications) and IS-95, or with third-generation (3G) wireless communication protocols, such as UMTS (Universal Mobile Telecommunications System), CDMA (Code Division Multiple Access) 2000, wideband CDMA (WCDMA) and time division-synchronous CDMA (TD-SCDMA), with 3.9G wireless communication protocols such as E-UTRAN (evolved-UMTS (Universal Mobile Telecommunications System) terrestrial radio access network), with fourth-generation (4G) wireless communication protocols or the like.

It is understood that the apparatus, such as the processor 40, may include circuitry implementing, among others, audio and logic functions of the mobile terminal 10. The processor 40 may be embodied in a number of different ways. For example, the processor 40 may be embodied as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 40 may include one or more processing cores configured to perform independently. A multi-core processor may enable multiprocessing within a single physical package. Additionally or alternatively, the processor 40 may include one or more processors configured in tandem via the bus to enable independent execution of instructions, pipelining and/or multithreading.

In an example embodiment, the processor 40 may be configured to execute instructions stored in the memory device 62 or otherwise accessible to the processor 40. Alternatively or additionally, the processor 40 may be configured to execute hard coded functionality. As such, whether configured by hardware or software methods, or by a combination thereof, the processor 40 may represent an entity (e.g., physically embodied in circuitry) capable of performing operations according to embodiments of the present invention while configured accordingly. Thus, for example, when the processor 40 is embodied as an ASIC, FPGA or the like, the processor 40 may be specifically configured hardware for conducting the operations described herein. Alternatively, as another example, when the processor 40 is embodied as an executor of software instructions, the instructions may specifically configure the processor 40 to perform the algorithms and/or operations described herein when the instructions are executed. However, in some cases, the processor 40 may be a processor of a specific device (e.g., a mobile terminal) adapted for employing embodiments of the present invention by further configuration of the processor 40 by instructions for performing the algorithms and/or operations described herein. The processor 40 may include, among other things, a clock, an arithmetic logic unit (ALU) and logic gates configured to support operation of the processor 40.

The mobile terminal 10 may also comprise a user interface including an output device such as an earphone or speaker 44, a ringer 42, a microphone 46, a display 48, and a user input interface, which may be coupled to the processor 40. The mobile terminal 10 may further include sensor(s) 47 for detecting a stimulus such as a button for detecting a depression, a touch sensitive display for detecting a touch, or a motion sensor to detect motion. The user input interface, which allows the mobile terminal to receive data, may include any of a number of devices allowing the mobile terminal to receive data, such as a keypad 50, a touch sensitive display (not shown) or other input device. In embodiments including the keypad, the keypad may include numeric (0-9) and related keys (#, *), and other hard and soft keys used for operating the mobile terminal 10. Alternatively, the keypad may include a conventional QWERTY keypad arrangement. The keypad may also include various soft keys with associated functions. In addition, or alternatively, the mobile terminal may include an interface device such as a joystick or other user input interface. The mobile terminal may further include a battery 54, such as a vibrating battery pack, for powering various circuits that are used to operate the mobile terminal, as well as optionally providing mechanical vibration as a detectable output.

The mobile terminal 10 may further include a user identity module (UIM) 58, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile terminal may be equipped with memory. For example, the mobile terminal may include volatile memory 60, such as volatile Random Access Memory (RAM) including a cache area for the temporary storage of data. The mobile terminal may also include other non-volatile memory 62, which may be embedded and/or may be removable. The non-volatile memory may additionally or alternatively comprise an electrically erasable programmable read only memory (EE-PROM), flash memory or the like. The memories may store any of a number of pieces of information, and data, used by the mobile terminal to implement the functions of the mobile terminal. For example, the memories may include an identifier, such as an international mobile equipment identification (IMEI) code, capable of uniquely identifying the mobile terminal. Furthermore, the memories may store instructions for determining cell id information. Specifically, the memories may store an application program for execution by the processor 40, which determines an identity of the current cell, e.g., cell id identity or cell id information, with which the mobile terminal is in communication.

As further described below, example embodiments of the present invention may be implemented in conjunction with a first mode of a mobile terminal, which may include an unrestricted mode, and a second mode, which may include a restricted mode, such as one or more of a low power mode or a locked mode. The unrestricted mode, as described herein, may provide for all, or substantially all, of the functions of a mobile terminal to be available for use by a user, including full interaction with a display of the device. For example, a mobile terminal operating in an unrestricted mode may be configured to receive input commands through the user inputs (e.g., buttons, keys, virtual buttons of a touch-screen, sensors, etc.), and the mobile terminal may present information to a user on the display which may be interacted with, such as an internet browser, email application, or any available applications or functions of the device. In the unrestricted mode, a user may be able to access substantially all of the functionality of the mobile terminal.

The restricted mode of a mobile terminal may include, for example a low power mode or a locked mode. A low power mode, as described herein with reference to a display (e.g., display 48) which may include a user interface, is a mode in which the display is configured to have lower power consumption than when the display operates in a normal power mode. As examples, the low power mode may disable a portion of the display, or it may disable certain pixels or pixel rows of the display or it may reduce or turn off a backlight for the display. Optionally, the refresh rate of display might be changed to be longer. In the case of light emitting diode (LED) or organic light emitting diode (OLED) displays, the low power mode may include a display background where the LED/OLED pixels are turned off and information is displayed with LED/OLED pixels that are operating at less than their normal brightness. Further, the color presented in a low power mode may influence the power consumption as a white color may require more power to display than a red color. Embodiments of the present invention may include multiple low power modes with varying levels of power consumption, each mode potentially presenting different amounts and different levels of information dependent upon the desired power consumption. User inputs, such as keypad 50, may be inoperable during a low-power mode such that the mobile terminal may be required to exit the low power mode for the inputs to be operable.

A locked mode, as described herein, may implement similar features as the low power mode, and may further preclude interface with some or all of the inputs of a mobile terminal. For example, the user interface may accept no other inputs other than a passcode to transition the mobile terminal from the locked mode to an unlocked mode where the user interface may be fully operational and substantially all inputs are available to a user. Optionally, in the locked mode, some inputs of the user interface may remain available to a user, such as volume control inputs, or the ability to make emergency phone calls.

The locked or low-power embodiments of the restricted mode, while precluding operation of certain features of the mobile terminal by a user, may not preclude the mobile terminal from performing functions that are conventionally performed without user interaction, such as receiving data from a network, updating applications or dynamic information within an application. For example, an email or a phone call may still be received by the mobile terminal while the mobile terminal is operating in the restricted mode; however, a user's ability to view the email or answer the phone call may be precluded while operating in the restricted mode.

In general, example embodiments of the present invention provide for a method for identifying an area of a display as a designated area containing designated information when the mobile terminal is operating in the unrestricted mode. The method of an example embodiment may continue to present the designated information on the display of the mobile terminal, even after the mobile terminal has transitioned to a restricted mode, such as a locked mode or a low-power mode.

Displays 48 of mobile terminals 10 may have relatively large power consumption requirements from the battery 54 or wired power source when the display is presenting information to a user during the use of an application or function of the mobile terminal while operating in an unrestricted mode. However, when the mobile terminal is not in use, the display may operate in a low power mode to conserve battery life and extend the operating time of the mobile terminal. During the low power mode, it may be desirable for a user to be able to view select information or reference information presented by the mobile terminal. To view or reference the desired information, the user may not wish to disable the low power mode and activate a normal power mode as frequent referencing of the desired information may reduce the battery life of the mobile terminal 10. Further, the sequence of inputs required to exit a low-power mode may be obtrusive to a user who simply wishes to reference a particular piece of information.

Similarly, mobile terminals 10 may include personal information or other data which a user wishes to keep secure. Optionally, a user may wish to disable functionality of a mobile terminal 10 to prevent unauthorized access to the personal information or other data as well as to various features and functions of a mobile terminal. Mobile terminals 10 may include a locked mode in which some, or the entire user interface may be disabled. However, when the mobile terminal 10 is in the locked mode, it may still be desirable for a user to view select information or reference information presented by the mobile terminal. It may also be desirable to have limited functionality available with regard to the information that remains presented while the mobile terminal is in the locked mode.

A user may exit the restricted, low power mode or locked mode when necessary and return to the unrestricted, normal power mode by entering a user input. The user input may be a key sequence, the depression of a key or keys for a prolonged period, removal of the mobile terminal from a cradle or holster, a particular motion of the mobile terminal, hand gesture, voice command or any number of other possible methods. However, it may be cumbersome for a user to perform the sequence of inputs or gestures to unlock a mobile terminal to the unrestricted mode simply to view a piece of information. As such, it may be desirable to present designated information while the mobile terminal is operating in a restricted mode, such as a low power mode or a locked mode, and to provide limited functionality with regard to interaction with the designated information.

Different applications and programs that can be executed by a mobile terminal 10 may present various assortments of information to a user of the mobile terminal. For example, an email application may present a list of new or most recent emails. A map application may present a current location of the mobile terminal or a point of interest on a map. A music player application may present information about the music playing or to be played and any art from the album that the music belongs to. Each of these examples may present information that causes the display to draw considerable power resources when the display is operating in an unrestricted mode such as a normal power mode. When the mobile terminal reverts to a restricted mode, for example, after an elapsed time of inactivity or when the mobile terminal receives a command to enter the restricted mode, a user may still wish for some information from the active application to continue to be displayed. As a display 48 of a mobile terminal 10 is capable of displaying vast amounts of information when a mobile terminal is operating in an unrestricted mode, it may be desirable to have a user-selectable portion of the display which may remain visible, and possibly receive user input, while the remainder of the display is inactive.

Embodiments of the present invention provide for a method of selecting a portion of a display (such as display 48) that is to remain visible, or includes information that is to remain visible, when a mobile terminal (such as mobile terminal 10) enters a restricted mode such as a low power mode or a locked mode. A user may select a portion of the display, referred to herein as the designated area, which contains information or functions of an application (e.g., the designated information) which the user wants to be able to view and/or access when the mobile terminal is in a low power or locked mode (e.g., when the remainder of the display is inactive).

While example mobile terminals, such as mobile terminal 10, operating in low power or locked modes may present some predefined information to a user, such as the time and date, notifications (e.g., emails, text messages, appointments, etc.), the predefined information presented may be based upon the software and applications in use on the mobile terminal. As mobile terminals are capable of performing a wide variety of tasks and applications, the information available on mobile terminals far exceeds the information configured to be presented through notifications during the low power or locked modes. Allowing access to a running application that would otherwise be occluded by a locked display or display operating in a low power mode may offer a user an enhanced and improved user experience by allowing the user to customize what information may be presented and which features of an application may be available while the mobile terminal is in a locked or in low power mode. Embodiments of the present invention may allow mobile terminals to be more flexible and provide access to information that can support a user's current task without requiring the user to unlock the mobile terminal or exit a low power mode. This need may be addressed by allowing a user to define a region of interest of the display that includes information that should not be occluded during a locked or low power mode, thereby permitting a user to choose portions of applications or information from within applications to remain visible and/or accessible during the locked and low power modes.

Figure 3:
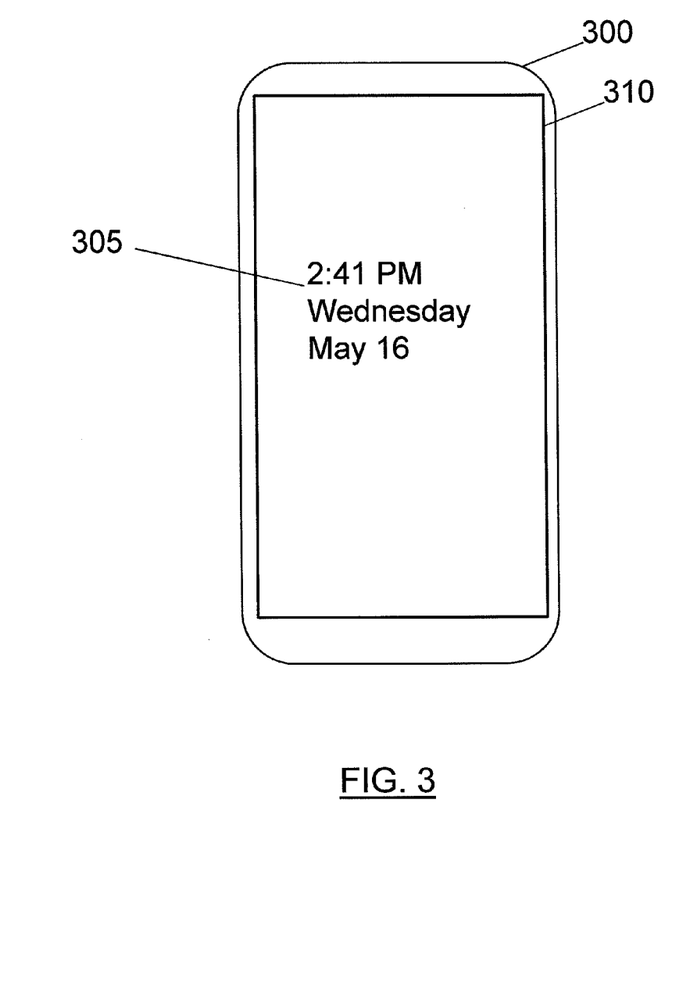
FIG. 3 illustrates a mobile terminal including a display operating in a restricted mode, according to an example embodiment of the present invention.

FIG. 3 illustrates an example embodiment of a mobile terminal 300 including a display 310. The display 310 is illustrated as presenting predefined information 305 while the mobile terminal is operating in a restricted, low power mode or locked mode. The predefined information may include the time and day, notifications, or the like, but the mobile terminal 300 and the display 310 may lack the full functionality available in the operational mode.

Figure 4:
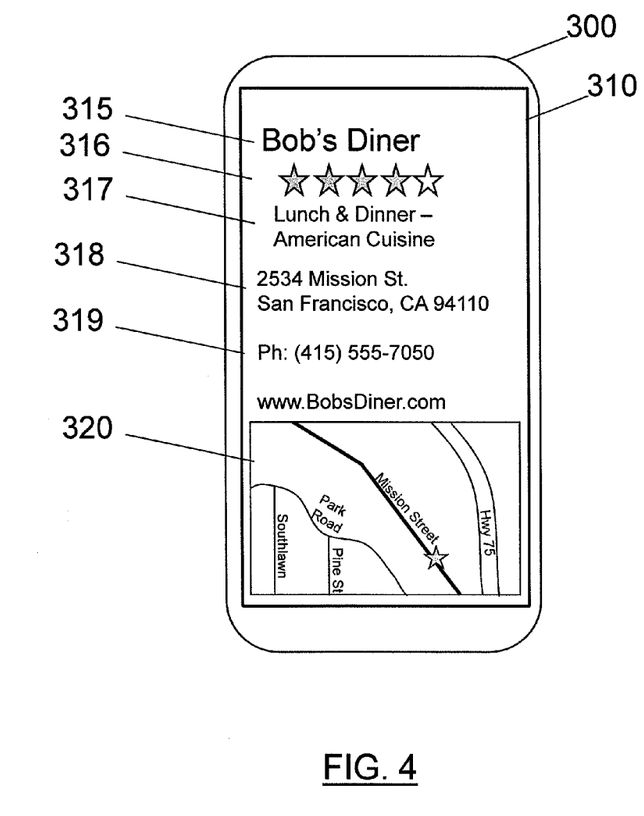
FIG. 4 illustrates a mobile terminal including a display operating in an unrestricted mode, according to an example embodiment of the present invention.

FIG. 4 depicts a mobile terminal 300 including a display 310, the mobile terminal 300 operating in an unrestricted mode. In the illustrated embodiment, presented on the display 310 is information from an application that may provide restaurant reviews and information. The selected establishment of "Bob's Diner" is presented on the display 310 including the name of the establishment 315, a rating 316, information regarding the cuisine 317, an address 318, a phone number 319, and a map 320. A user viewing this information may decide that they wish to visit this establishment and begin to drive or walk to "Bob's Diner." As the mobile terminal 300 may be configured to enter a locked mode or low power mode after a predetermined amount of time has elapsed without receiving an input, the user may wish for some of the information that would not otherwise be provided during a low power or locked mode to remain visible within the designated area even after the mobile terminal has entered the low power or locked mode.

Figure 5:
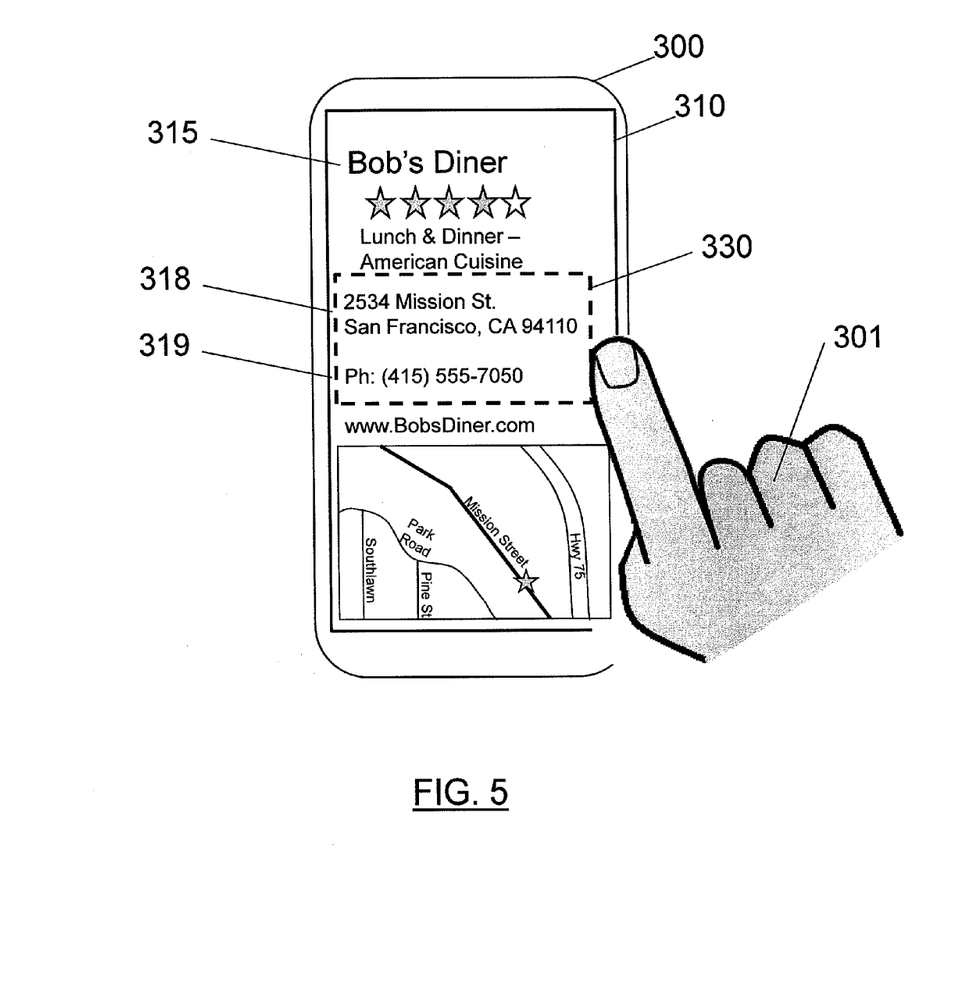
FIG. 5 is an example embodiment of a user selecting a portion of a display as a designated area.

FIG. 5 illustrates the mobile terminal of FIG. 4, where a user 301 has indicated a portion of the display 310 that is to be the designated area 330. The designated area 330 of the illustrated embodiment contains designated information including the address 318 and the phone number 319. The designated area 330 may be selected in a number of ways including a user drawing a line around the area that is to be designated, a user pressing and holding a region of the display 310 indicating that the area proximate the touch is to be designated, or any other manner in which a portion of the display 310 (e.g., the designated area 330) is distinguished from the remaining area of the display 310 (e.g., the undesignated area).

Figure 6:
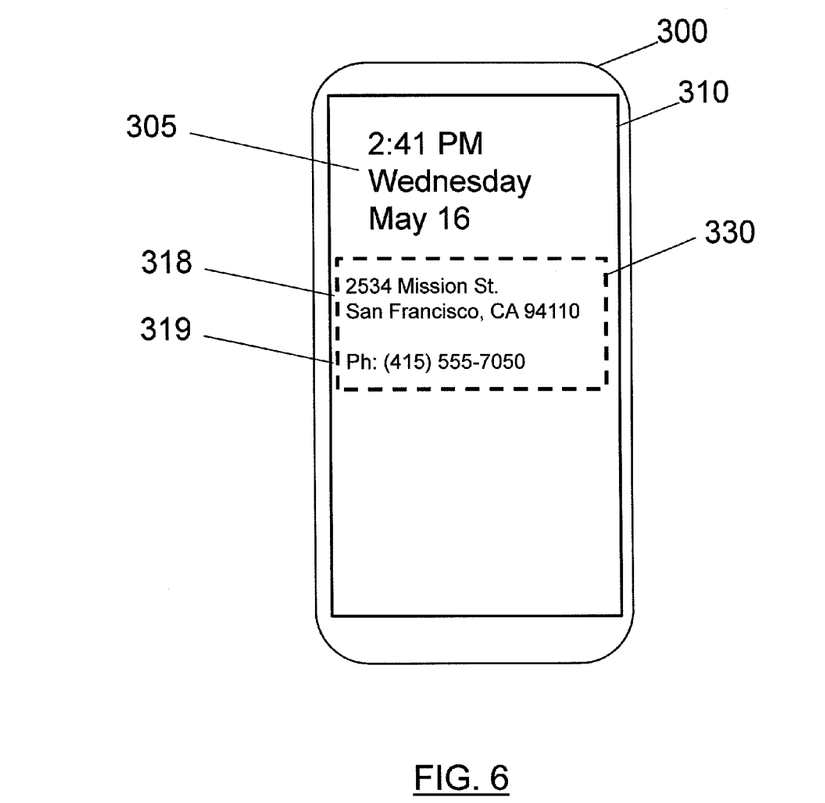
FIG. 6 illustrates a designated area in an unrestricted mode and an undesignated area in a restricted mode according to an example embodiment of the invention.

After a predetermined time has elapsed since the last input was received at the mobile terminal 300, or in response to a user providing an input indicating the mobile terminal should enter the locked or low power mode, the mobile terminal 300 may enter a low power mode or locked mode. FIG. 6 illustrates the mobile terminal 300 in a locked or low power mode, presenting the predefined information 305 from the low power mode or locked mode and additionally displaying the designated information within the designated area 330 including the address 318 and the phone number 319. As illustrated, even after the mobile terminal has entered the restricted mode, the designated information that the user selected in the designated area 330 remains visible. This may allow a user to quickly reference the designated information of the designated area without requiring the user to unlock the mobile terminal or transition the mobile terminal to an unrestricted mode.

In an example embodiment, the predefined information 305 that is presented in a low power mode or locked mode may be repositioned in response to designated information from the designated area 330 also being presented on the display 310 in a low power or locked mode. Optionally, the designated information 318, 319 may be repositioned when presented on the display 310 in the low power mode or locked mode, such as to avoid contention with the predefined information. In the event that the designated area 330 is sufficiently large that the designated information and the predefined information generally displayed in the low power or locked mode cannot be displayed together, the designated information may be displayed in lieu of the predefined information that would otherwise be displayed in the low power or locked mode, or the predefined information may be scaled to accommodate all of the information, both predefined and designated, that is configured to be presented on the display. Still further, the designated information of the designated area may be configured, for example, by user settings, to supersede the predefined information 305 that is typically presented in a low power mode such that the designated information may be presented and the predefined information typically presented in the low power mode may be omitted from the display 310.

In some example embodiments, the designated information 318, 319, may be modified for presentation on the display 310 during the restricted mode. For example, information that is presented in an application with a background image or pattern may be modified such that only the information is presented as designated information in the restricted mode, without the background image or pattern. The designated information may also be modified, for example by scaling to larger or smaller fonts, changing a font type, or changing a font color in order to provide better contrast in the restricted mode. In example embodiments where the designated information includes a map or an image, the image may be modified by scaling, zooming, or otherwise altering the image for presentation while the mobile terminal is in the restricted mode.

While the illustrated designated area 330 is shown as a rectangle, any shape may be used. For example, the portion selected as the designated area may be a circle, a rectangle, or any other shape. The type of shape may be user configurable and the size may be adjusted according to the information that the user wishes to include in the designated area. The portion selected as the designated area may also be selected by a free-form drawing received by a touch screen display of a closed or substantially closed shape to enclose a portion of the display which becomes the designated area. Further, while only one designated area 330 is illustrated in the example embodiments, multiple portions of the display may be selected as designated areas for presentation of designated information while the device is operating in the restricted mode. Additionally or alternatively, a single designated area may include portions of more than one application. For example, a portion of the display selected as a designated area may include sub-areas for the display of designated information from both a first application and a second application. The designated information from the first application and the second application may both be presented when the mobile terminal transitions to the restricted mode.

Figure 7:
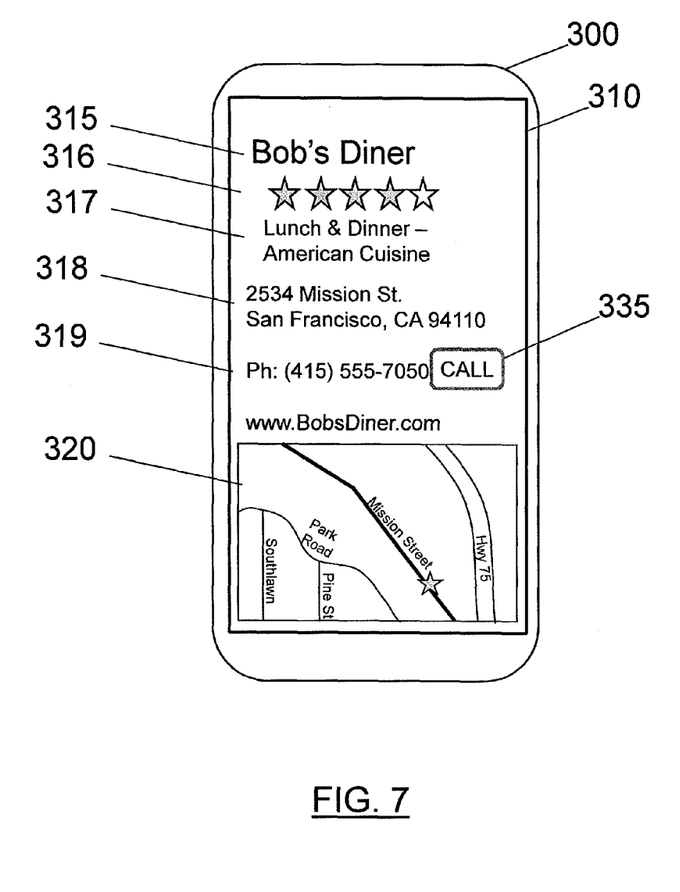
FIG. 7 illustrates a mobile terminal including a display operating in an unrestricted mode, according to an example embodiment of the present invention.
Figure 8:
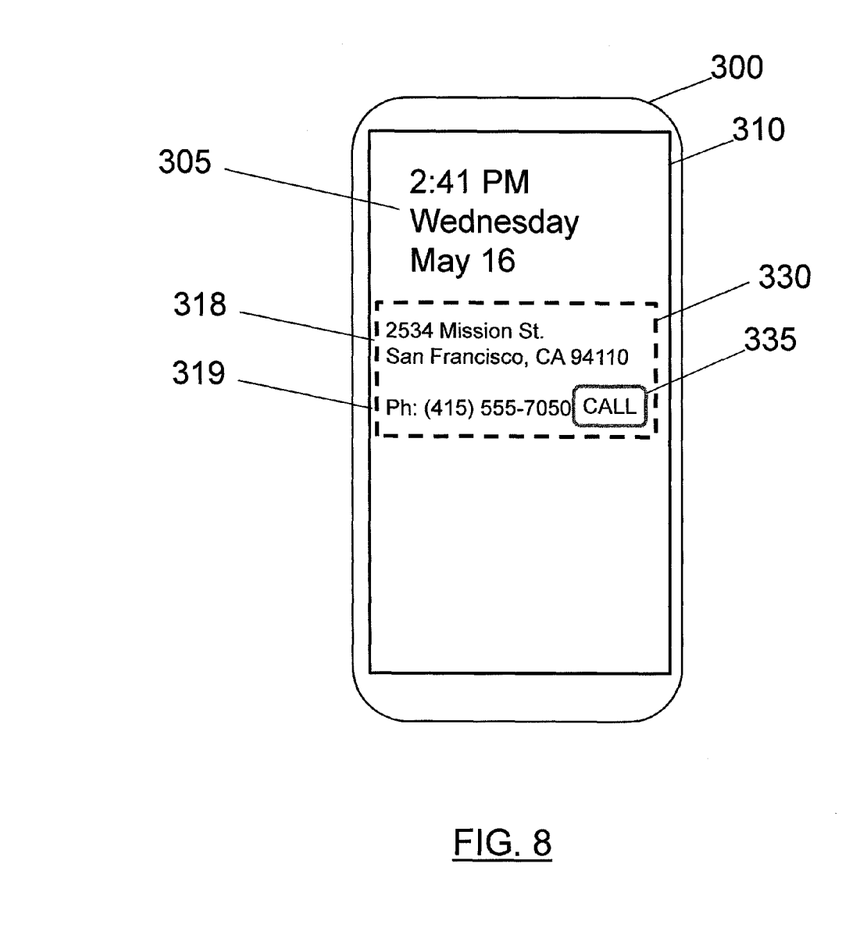
FIG. 8 illustrates a designated area in an unrestricted mode and an undesignated area in a restricted mode according to an example embodiment of the invention.

FIG. 7 illustrates another example embodiment similar to that of FIG. 4; however, a user input key 335 to initiate a call to the phone number 319 may be displayed within the information for Bob's Diner. In an example embodiment, if the user input key 335 is included in the designated area 330, the user input key 335 may be operable when the mobile terminal 300 is in the locked or low-power mode. As illustrated in FIG. 8, the user input key 335 is included within the designated area 330 and may be operable in the locked or low power mode to place a call to the listed phone number 319. Thus, the designated area may not only include the designated information, it may also or alternatively include other objects including one or more input features, e.g., input key 335, that are actuatable by the user to perform a corresponding function even while the mobile terminal remains in the restricted mode.

The functionality of user inputs that are within the designated area may be a user-configurable feature of an embodiment of the present invention. The feature of creating a designated area for presentation of information during a low power or locked mode may include a settings feature which allows a user to configure various features of the designated area. For example, a user may be able to configure the inputs of a selected designated area as enabled or disabled. A user may wish to enable the inputs of a designated area for convenience; however, for security reasons, the user may wish to disable certain inputs in some embodiments.

Example embodiments of the present invention may be beneficial in various circumstances, including when allowing a child to use a mobile terminal while disabling functions of the mobile terminal to which the child may not require access. For example, in an embodiment where a video is being displayed, the designated area may include the area of the display in which the video is shown. Thus, when the mobile terminal enters a low-power mode or locked mode, the video may remain displayed and may be viewed while other features of the mobile terminal may be disabled. Further, if the user has selected that inputs are disabled, the video may not be inadvertently paused or stopped by accidental touching of the display if the display is a touch-screen display.

An advantage of the present invention may include that the user need only define a designated area that is to be viewable and accessible when the mobile terminal enters a restricted mode, such as a low power or locked mode. Embodiments of the present invention may be application agnostic such that the designated area may be selected regardless of the application that is active on the mobile terminal and the applications used by the mobile terminal do not need to have separate functionality incorporated. This may allow example embodiments of the invention to be used with existing applications and future applications without additional application code.

In some example embodiments, the designated area of example embodiments may be associated with an application that occupied the designated area of the display at the time that the designated area was selected, regardless of the applications occupying the display upon entry into the restricted mode. For example, if a first application is occupying the entire display, and a user selects a portion of the display to be the designated area, the selected designated area may be associated with the first application that is presented. If a second application is subsequently opened and occludes the first application by occupying the display, and the display subsequently enters a low power mode or locked mode, the designated information of the first application from the designated area may be presented in the restricted mode, despite the first application being occluded prior to entering the restricted mode.

Figure 9:
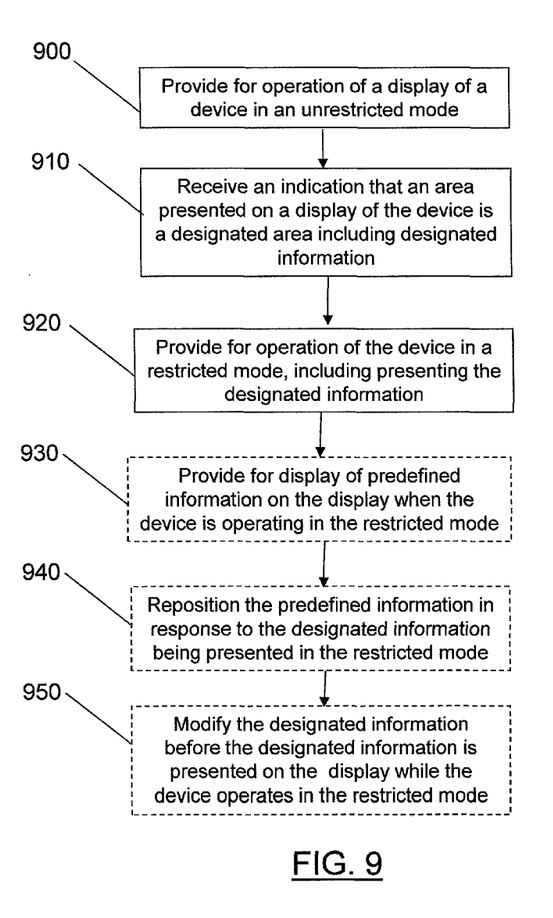
FIG. 9 is a flowchart of a method of operating a designated area of a display in an unrestricted mode while an undesignated area operates in a restricted mode according to an example embodiment of the present invention.

FIG. 9 illustrates a flowchart of a method of operating a mobile terminal according to an example embodiment of the present invention. An apparatus embodied by the mobile terminal, and more particularly, the processor 40, the display 48, or the like, may be configured to provide for operation of a display a mobile terminal, such as mobile terminal 10, in an unrestricted mode as shown at operation 900. The apparatus embodied by the mobile terminal including the processor, a touch sensitive display or the like, may be configured to receive an indication that an area presented on a display, such as display 48, of the mobile terminal is a designated area including designated information at 910. The indication may be in the form of a shape that is drawn around the area, an area around a point of a touch received on a touch-screen display, or any other indication that an area of a display has been selected as the designated area. The portion of the display that is not designated may be the undesignated area. The apparatus embodied by the mobile terminal and, more particularly, the processor, the display, or the like, may be configured to provide for operation of the mobile terminal in a restricted mode, where the designated information is presented in the restricted mode at 920. The information that was presented in the undesignated area of the display may not be presented in the restricted mode. The restricted, low power or locked mode may be entered in various manners including by virtue of a predetermined time elapsing since an input has been received or by an input received by the mobile terminal instructing the mobile terminal to enter the low power or locked mode.

FIG. 9 further illustrates operations which may or may not be implemented in conjunction with example embodiments of the present invention. Operations 930-950 of the flowchart of FIG. 9 are illustrated in broken lines to illustrate the optional nature of the operations. As illustrated at operation 930, the apparatus embodied by mobile terminals according to some example embodiments may be configured to provide for display of predefined information when the device is operating in the restricted mode. The predefined information, as outlined above, may include such information as the time, the date, notifications, etc. Additionally or alternatively, as shown at operation 940, the apparatus may be configured to reposition the predefined information in response to the designated information being presented while the mobile terminal is operating in the restricted mode. For example, the predefined information may be shifted relative to the location in which it is typically displayed in order to accommodate the designated information on the display. Additionally or alternatively, as shown at operation 950, the apparatus may be configured to modify the designated information before presenting the designated information on the display while the mobile terminal is operating in a restricted mode. For example, the designated information may be scaled, repositioned, or otherwise modified prior to display on the device operating in the restricted mode. Operation 950 may be used in conjunction with, or in lieu of operations 930 and 940.

As described above, FIG. 9 is a flowchart illustrating operations performed by or in relation to a mobile terminal of an example embodiment. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, and combinations of operations for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In an example embodiment, an apparatus for performing the methods of FIG. 9, described further below, may comprise a processor (e.g., the processor 40) configured to perform some or each of the operations (900-950) described below. The processor may, for example, be configured to perform the operations (900-950) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 900-950 may comprise, for example, the processor 40 and/or a device or circuit for executing instructions or executing an algorithm for processing information as described further below.

As described above and as will be appreciated by one skilled in the art, embodiments of the present invention may be configured as a system, method or electronic device. Accordingly, embodiments of the present invention may be comprised of various means including entirely of hardware or any combination of software and hardware. Furthermore, embodiments of the present invention may take the form of a computer program product on a computer-readable storage medium having computer-readable program instructions (e.g., computer software) embodied in the tangible, non-transitory storage medium. Any suitable computer-readable storage medium may be utilized including hard disks, CD-ROMs, optical storage devices, or magnetic storage devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and associated drawings describe example embodiments in the context of certain example combinations of elements and/or functions, it should be appreciated that different combinations of elements and/or functions may be provided by alternative embodiments without departing from the spirit and scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
providing for operation of a device in an unrestricted mode;
receiving an indication that an area presented on a display of the device is a designated area, wherein the indication is the creation of a border around an area presented, the designated area defined within the border, wherein the designated area comprises at least one input key configured to receive a user input and cause an action to be taken in response to receiving the user input, wherein another area of the display that is outside of the border and not the designated area is an undesignated area, the designated area comprising designated information, and the undesignated area comprising undesignated information;
providing for operation of the device in a restricted mode, wherein the designated information is presented on the display while the device is operating in the restricted mode and the undesignated information is not presented on the display while the device is operating in the restricted mode, wherein the designated information comprises dynamically updated information that is dynamically updated without user interaction, and wherein the at least one input key remains operable when the device is operating in the restricted mode; and
updating the dynamically updated information when the device is operating in the restricted mode.

2. The method of claim 1, wherein the unrestricted mode is an unlocked mode and the restricted mode is a locked mode.

3. The method of claim 1, further comprising providing for display of predefined information on the display when the device is operating in the restricted mode, and repositioning the predefined information on the display in response to the designated information being presented on the display while the device is operating in the restricted mode.

4. The method of claim 1, further comprising modifying the designated information before displaying the designated information on the display while the device is operating in the restricted mode.

5. The method of claim 1, wherein receiving the indication that the area presented on the display is the designated area comprises receiving an input from a user.

6. The method of claim 5, wherein receiving the input from a user comprises receiving an input circumscribing the area presented on the display.

7. The method of claim 1, wherein the designated information within the border is presented on the display in the restricted mode as the designated information was displayed in the unrestricted mode.

8. An apparatus comprising at least one processor and at least one memory including computer program code, the at least one memory and the computer program code configured to, with the at least one processor, cause the apparatus to perform:
provide for operation of a device in an unrestricted mode;
receive an indication that an area presented on a display of the device is a designated area, wherein the indication is the creation of a border around an area presented, the designated area defined within the border, wherein the designated area comprises at least one input key configured to receive a user input and cause an action to be taken in response to receiving the user input, wherein another area of the display that is outside of the border and not the designated area is an undesignated area, the designated area comprising designated information, and the undesignated area comprising undesignated information;
provide for operation of the device in a restricted mode, wherein the designated information is presented on the display while the device is operating in the restricted mode and the undesignated information is not presented on the display while the device is operating in the restricted mode, wherein the designated information comprises dynamically updated information that is dynamically updated without user interaction, and wherein the at least one input key remains operable when the device is operating in the restricted mode; and
update the dynamically updated information when the device is operating in the restricted mode.

9. The apparatus of claim 8, wherein the unrestricted mode is an unlocked mode and the restricted mode is a locked mode.

10. The apparatus of claim 8, wherein the apparatus is further caused to provide for display of predefined information on the display when the device is operating in the restricted mode, and reposition the predefined information in response to the designated information being presented on the display while the device is operating in the restricted mode.

11. The apparatus of claim 8, wherein the apparatus is further caused to modify the designated information before displaying the designated information on the display while the device is operating in the restricted mode.

12. The apparatus of claim 8, wherein causing the apparatus to receive the indication that the area presented on the display is the designated area comprises causing the apparatus to receive an input from a user.

13. The apparatus of claim 12, wherein causing the apparatus to receive the input from a user comprises causing the apparatus to receive an input circumscribing the area presented on the display.

14. The apparatus of claim 8, wherein the designated information within the border is presented on the display in the restricted mode as the designated information was displayed in the unrestricted mode.

15. A computer program product comprising at least one computer-readable storage medium having computer-executable program code instructions stored therein, the computer-executable program code instructions comprising:
program code instructions for providing for operation of a device in an unrestricted mode;
program code instructions for receiving an indication that an area presented on a display of the device is a designated area, wherein the indication is the creation of a border around an area presented, the designated area defined within the border, wherein the designated area comprises at least one input key configured to receive a user input and cause an action to be taken in response to receiving the user input, wherein another area of the display that is outside of the border and not the designated area is an undesignated area, the designated area comprising designated information and the undesignated area comprising undesignated information;
program code instructions for providing for operation of the device in a restricted mode, wherein the designated information is presented on the display while the device is operating in the restricted mode and the undesignated information is not presented on the display while the device is operating in the restricted mode, wherein the designated information comprises dynamically updated information that is dynamically updated without user interaction, and wherein the at least one input key remains operable when the device is operating in the restricted mode; and
program code instructions for updating the dynamically updated information when the device is operating in the restricted mode.

16. The computer program product of claim 13, wherein the unrestricted mode is an unlocked mode and the restricted mode is a locked mode.

17. The computer program product of claim 13, further comprising program code instructions for providing for display of predefined information on the display when the device is operating in the restricted mode; and program code instructions for repositioning the predefined information on the display in response to the designated information being presented on the display while the device is operating in the restricted mode.

18. The computer program product of claim 13, further comprising program code instructions for modifying the designated information before it is presented on the display while the device is operating in the restricted mode.

19. The computer program product of claim 15, wherein the designated information within the border is presented on the display in the restricted mode as the designated information was displayed in the unrestricted mode.

* * * * *